United States Patent
Ma et al.

(10) Patent No.: US 9,908,312 B2
(45) Date of Patent: Mar. 6, 2018

(54) FILM COMPOSITION, FILM MADE FROM THE FILM COMPOSITION AND A MULTI-LAYER FILM INCLUDING THE FILM AND ARTICLES MADE THEREFROM

(71) Applicant: Dow Global Technologies LLC, Midland, MI (US)

(72) Inventors: Hongming Ma, Lake Jackson, TX (US); Claudia Hernandez, Lake Jackson, TX (US); Jose Saavedra, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 314 days.

(21) Appl. No.: 14/442,448

(22) PCT Filed: Nov. 20, 2013

(86) PCT No.: PCT/US2013/070925
§ 371 (c)(1),
(2) Date: May 13, 2015

(87) PCT Pub. No.: WO2014/081777
PCT Pub. Date: May 30, 2014

(65) Prior Publication Data
US 2016/0271916 A1    Sep. 22, 2016

Related U.S. Application Data

(60) Provisional application No. 61/728,916, filed on Nov. 21, 2012, provisional application No. 61/906,495, filed on Nov. 20, 2013.

(51) Int. Cl.
| | |
|---|---|
| *B32B 27/32* | (2006.01) |
| *B32B 27/20* | (2006.01) |
| *B32B 27/08* | (2006.01) |
| *B32B 7/02* | (2006.01) |
| *C08J 5/18* | (2006.01) |
| *C08L 23/16* | (2006.01) |
| *C08L 23/08* | (2006.01) |
| *C08L 23/14* | (2006.01) |

(52) U.S. Cl.
CPC ............ *B32B 27/32* (2013.01); *B32B 7/02* (2013.01); *B32B 27/08* (2013.01); *B32B 27/20* (2013.01); *C08J 5/18* (2013.01); *C08L 23/0815* (2013.01); *C08L 23/142* (2013.01); *C08L 23/16* (2013.01); *B32B 2250/242* (2013.01); *B32B 2250/40* (2013.01); *B32B 2307/4026* (2013.01); *B32B 2307/51* (2013.01); *B32B 2439/00* (2013.01); *C08J 2323/08* (2013.01); *C08J 2323/14* (2013.01); *C08L 2203/16* (2013.01); *C08L 2205/02* (2013.01)

(58) Field of Classification Search
None
See application file for complete search history.

(56) References Cited

U.S. PATENT DOCUMENTS

| | | | |
|---|---|---|---|
| 6,525,157 B2 | 2/2003 | Cozewith et al. | |
| 6,960,635 B2 | 11/2005 | Stevens et al. | |
| 8,835,567 B2 | 9/2014 | Demirors et al. | |
| 2012/0196061 A1* | 8/2012 | Weisinger | B32B 27/08 428/35.2 |

FOREIGN PATENT DOCUMENTS

| | | |
|---|---|---|
| WO | 2011163076 | 12/2011 |
| WO | 2012094317 | 7/2012 |

OTHER PUBLICATIONS

EP Office Action dated Jun. 29, 2016; from EP counterpart Application No. 13799461.2.
Sukhadia et al; "The Effect of Comonomer Type on the Blown Film Performance of LLDPE Resins Made using a Metallocene Single-Site Catalyst," SPE/ANTEC 2000 Proceedings, vol. 2 (May 7, 2000), pp. 1578-1582.
EP Response to Office Action dated Nov. 2, 2016; from EP counterpart Application No. 13799461.2.
EP Response to Office Action dated Jan. 5, 2016; from EP counterpart Application No. 13799461.2.
PCT/US2013/070925 International Search Report dated Feb. 21, 2014, 5 pages.
PCT/US2013/070925 International Preliminary Report on Patentability dated Jun. 4, 2015, 8 pages.
European Patent Office Communication pursuant to Rules 161(1) and 162 EPC dated Jun. 30, 2015 for counterpart EPO Application No. 13799461.2, 2 pages.

* cited by examiner

*Primary Examiner* — Sheeba Ahmed
(74) *Attorney, Agent, or Firm* — Brooks, Cameron & Huebsch, PLLC

(57) ABSTRACT

A film composition comprising from 5 to 75 percent by weight of an ethylene/α-olefin interpolymer composition (LLDPE), and from 25 to 95 percent by weight of a propylene/α-olefin interpolymer composition, and films made from the film composition, wherein the films exhibited synergistic physical properties, namely holding force and elastic recovery, are provided.

11 Claims, No Drawings

FILM COMPOSITION, FILM MADE FROM THE FILM COMPOSITION AND A MULTI-LAYER FILM INCLUDING THE FILM AND ARTICLES MADE THEREFROM

FIELD OF INVENTION

The instant invention relates to a film composition, a film made from the film composition a multi-layer film including the film, and articles made therefrom.

BACKGROUND OF THE INVENTION

In the field of stretch hood film, both good holding force and elastic recovery are desirable characteristics. Films produced from certain ethylene-based polymers exhibit good holding force but exhibit poor elastic recovery. Films produced from certain propylene-based polymers exhibit good elastic recovery but poor holding force. Combinations of such ethylene-based and propylene-based polymers typically exhibit holding force reduced from that exhibited by ethylene-based polymer films and elastic recovery from that exhibited by propylene-based polymer films. Therefore, a need still exists for films exhibiting both good holding force and elastic recovery.

SUMMARY OF THE INVENTION

The instant invention is a film composition, a film made from the film composition a multi-layer film including the film, and articles made therefrom.

In one embodiment, the instant invention provides a film composition comprising: (a) from 5 to 75 percent by weight of an ethylene/α-olefin interpolymer composition (LLDPE), based on the total weight of the film composition, having a Comonomer Distribution Constant (CDC) in the range of from 75 to 200; a zero shear viscosity ratio (ZSVR) of at least 2; a density in the range of from 0.865 to 0.930 g/cm$^3$, a melt index (I$_2$) in a range of from 0.1 to 5 g/10 minutes, less than 120 total unsaturation units/1,000,000 carbons, and long chain branching frequency in the range of 0.01 to 3 long chain branches (LCB) per 1000 carbons; and (b) from 25 to 95 percent by weight of a propylene/α-olefin interpolymer composition, based on the total weight of the film composition, wherein said propylene/α-olefin interpolymer composition comprises a propylene/α-olefin copolymer or a propylene/ethylene/butene terpolymer, wherein said propylene/α-olefin interpolymer has a crystallinity in the range of from 1 percent by weight to 30 percent by weight, a heat of fusion in the range of from 2 Joules/gram to 50 Joules/gram, and a DSC melting point in the range of 25° C. to 110° C.

DETAILED DESCRIPTION OF THE INVENTION

The instant invention is a film composition, a film made from the film composition a multi-layer film including the film, and articles made therefrom.

The film composition according to the present invention comprises: (a) from 5 to 75 percent by weight of an ethylene/α-olefin interpolymer composition (LLDPE), based on the total weight of the film composition, having a Comonomer Distribution Constant (CDC) in the range of from 75 to 200; a zero shear viscosity ratio (ZSVR) of at least 2; a density in the range of from 0.865 to 0.930 g/cm$^3$, a melt index (I$_2$) in a range of from 0.1 to 5 g/10 minutes, less than 120 total unsaturation units/1,000,000 carbons, and long chain branching frequency in the range of 0.01 to 3 long chain branches (LCB) per 1000 carbons; and (b) from 25 to 95 percent by weight of a propylene/α-olefin interpolymer composition, based on the total weight of the film composition, wherein said propylene/α-olefin interpolymer composition comprises a propylene/α-olefin copolymer or a propylene/ethylene/butene terpolymer, wherein said propylene/α-olefin interpolymer has a crystallinity in the range of from 1 percent by weight to 30 percent by weight, a heat of fusion in the range of from 2 Joules/gram to 50 Joules/gram, and a DSC melting point in the range of 25° C. to 110° C.

Ethylene/α-Olefin Interpolymer Composition

The film composition comprises from 5 to 75 percent by weight of an ethylene-based interpolymer composition. All individual values and subranges from 5 to 75 percent by weight of an ethylene/α-olefin interpolymer composition are included herein and disclosed herein; for example, the amount of the ethylene/α-olefin interpolymer composition in the film composition can be from a lower limit of 5, 15, 25, 35, 45, 55, 65 or 70 percent by weight to an upper limit of 20, 30, 40, 50, 60, 70 or 75 percent by weight. For example, the amount of the ethylene/α-olefin interpolymer composition in the film composition may be in the range of from 5 to 75 percent by weight, or in the alternative, the amount of the ethylene/α-olefin interpolymer composition in the film composition may be in the range of from 25 to 75 percent by weight, or in the alternative, the amount of the ethylene/α-olefin interpolymer composition in the film composition may be in the range of from 35 to 75 percent by weight, or in the alternative, the amount of the ethylene/α-olefin interpolymer composition in the film composition may be in the range of from 40 to 70 percent by weight, or in the alternative, the amount of the ethylene/α-olefin interpolymer composition in the film composition may be in the range of from 5 to 65 percent by weight, The ethylene/α-olefin interpolymer composition (linear low density polyethylene (LLDPE)) comprises (a) less than or equal to 100 percent, for example, at least 70 percent, or at least 80 percent, or at least 90 percent, by weight of the units derived from ethylene; and (b) less than 30 percent, for example, less than 25 percent, or less than 20 percent, or less than 10 percent, by weight of units derived from one or more α-olefin comonomers. The term "ethylene/α-olefin interpolymer composition" refers to a polymer that contains more than 50 mole percent polymerized ethylene monomer (based on the total amount of polymerizable monomers) and, optionally, may contain at least one comonomer.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may be selected, for example, from the group consisting of propylene, 1-butene, 1-hexene, and 1-octene; or in the alternative, from the group consisting of 1-hexene and 1-octene.

The ethylene/α-olefin interpolymer composition is characterized by having a Comonomer Distribution Constant (CDC) in the range of from greater than from 75 to 200. All individual values and subranges from 75 to 200 are disclosed herein and included herein; for example, the CDC can be from a lower limit of 75, 95, 115, 135, 155, 175 or 195 to an upper limit of 80, 100, 120, 140, 160, 180 or 200. For example, the CDC may be in the range of from 75 to 200, or in the alternative, the CDC may be in the range of from 85 to 150, or in the alternative, the CDC may be in the range of from 85 to 125, or in the alternative, the CDC may be in the range of from 75 to 175.

The ethylene/α-olefin interpolymer composition is characterized by having a zero shear viscosity ratio (ZSVR) of at least 2. All individual values and subranges from at least 2 are included herein and disclosed herein; for example, the ZSVR can be from a lower limit of 2, or in the alternative, from a lower limit of 5, or in the alternative, from a lower limit of 8, or in the alternative from a lower limit of 10. In yet an alternative embodiment, the ZSVR is equal to or less than 50. All individual values and subranges are included herein and disclosed herein; for example, the ZSVR is from an upper limit of 50, or in the alternative, from an upper limit of 40, or in the alternative, from an upper limit of 30, or in the alternative, from an upper limit of 20. In yet alternative embodiments, the ZSVR may be in the range from 2 to 50, or in the alternative, from 2 to 20, or in the alternative, from 2 to 10, or in the alternative, from 2 to 6, or in the alternative, from 2.5 to 4.

The ethylene/α-olefin interpolymer composition has a density in the range of 0.865 to 0.930 g/cm$^3$. All individual values and subranges from 0.865 to 0.930 g/cm$^3$ are included herein and disclosed herein; for example, the density of the ethylene/α-olefin interpolymer composition can be from a lower limit of 0.865, 0.875, 0.885, 0.895, 0.905, 0.915, or 0.925 g/cm$^3$ to an upper limit of 0.87, 0.88, 0.89, 0.9, 0.91, 0.92 or 0.93 g/cm$^3$. For example, the density may be in the range of from 0.865 to 0.930 g/cm$^3$, or in the alternative, the density may be in the range of from 0.903 to 0.930 g/cm$^3$, or in the alternative, the density may be in the range of from 0.865 to 0.910 g/cm$^3$, or in the alternative, the density may be in the range of from 0.89 to 0.930 g/cm$^3$.

The ethylene/α-olefin interpolymer composition has a melt index ($I_2$) from 0.1 to 5 g/10 minutes. All individual values and ranges from 0.1 to 5 g/10 minutes are included herein and disclosed herein; for example, the $I_2$ can be from a lower limit of 0.1, 1, 1.5, 2, 2.5, 3, 3.5, 4, or 4.5 g·10 minutes to an upper limit of 0.5, 1.2, 1.7, 2.2, 2.7, 3.2, 3.7, 4.2, 4.7 or 5 g/10 minutes. For example, the melt index ($I_2$) may be in the range of from 0.1 to 5 g/10 minutes, or in the alternative, melt index ($I_2$) may be in the range of from 0.9 to 2.5 g/10 minutes, or in the alternative, melt index ($I_2$) may be in the range of from 2.5 to 5 g/10 minutes, or in the alternative, melt index ($I_2$) may be in the range of from 1.4 to 3.4 g/10 minutes, or in the alternative, melt index ($I_2$) may be in the range of from 1.75 to 3.75 g/10 minutes, or in the alternative.

In an alternative embodiment, the ethylene/α-olefin interpolymer composition has a molecular weight distribution ($M_w/M_n$) in the range of from 1.8 to 6. For example, the molecular weight distribution ($M_w/M_n$) can be from a lower limit of 1.8, 2.2, 3.4, 4.6, 5.8 to an upper limit of 2.5, 3.7, 4.8, 5.6 or 6.

In an alternative embodiment, the ethylene/α-olefin interpolymer composition has a molecular weight ($M_w$) in the range of 50,000 to 250,000 daltons. For example, the molecular weight ($M_w$) can be from a lower limit of 50,000, 60,000, 70,000 daltons to an upper limit of 150,000, 180,000, 200,000 or 250,000 daltons.

The ethylene/α-olefin interpolymer composition has less than 120 total unsaturation units/1,000,000 carbons present in the ethylene-based polymer composition. All individual values and subranges are included herein and disclosed herein; for example, the total unsaturation units per one million carbons can be from an upper limit of 120, 110, 100, 90 or 80 units. In an alternative embodiment, the ethylene/α-olefin interpolymer composition has less than 120 total unsaturation units/1,000,000 carbons has a lower limit of 10, 20, 30, 40, 50, 60, 70, or 79 units The ethylene/α-olefin interpolymer composition has a long chain branching frequency in the range of from 0.01 to 3 long chain branches (LCB) per 1000 carbons. All individual values and subranges from 0.1 to 3 LCB per 1000 carbons are included herein an disclosed herein; for example the long chain branching frequency can be from a lower limit of 0.01, 0.1, 0.5, 1, 1.5, 2, or 2.5 LCB per 1000 carbons to an upper limit of 0.06, 0.5, 1.4, 1.9, 2, 2.4, 2.9 or 3 LCB per 1000 carbons. For example, the long chain branching frequency may be in the range from 0.01 to 3 long chain branches (LCB) per 1000 carbons, or in the alternative, the long chain branching frequency may be in the range from 1.5 to 3 long chain branches (LCB) per 1000 carbons, or in the alternative, the long chain branching frequency may be in the range from 0.01 to 1.5 long chain branches (LCB) per 1000 carbons, or in the alternative, the long chain branching frequency may be in the range from 1 to 2 long chain branches (LCB) per 1000 carbons, or in the alternative, the long chain branching frequency may be in the range from 0.5 to 2.5 long chain branches (LCB) per 1000 carbons.

The ethylene/α-olefin interpolymer composition may further comprise additional components such as one or more other polymers and/or one or more additives. Such additives include, but are not limited to, antistatic agents, color enhancers, dyes, lubricants, fillers such as $TiO_2$ or $CaCO_3$, opacifiers, nucleators, processing aids, pigments, primary antioxidants, secondary antioxidants, processing aids, UV stabilizers, anti-blocks, slip agents, tackifiers, anti-static agents, fire retardants, anti-microbial agents, odor reducer agents, anti-fungal agents, and combinations thereof. The ethylene-based polymer composition may contain from about 0.1 to about 10 percent by the combined weight of such additives, based on the weight of the ethylene-based polymer composition including such additives.

In one embodiment, ethylene/α-olefin interpolymer composition has a comonomer distribution profile comprising a monomodal distribution or a bimodal distribution in the temperature range of from 35° C. to 120° C., excluding purge.

Any conventional ethylene (co)polymerization reaction processes may be employed to produce the ethylene-based polymer composition. Such conventional ethylene (co)polymerization reaction processes include, but are not limited to, gas phase polymerization process, slurry phase polymerization process, solution phase polymerization process, and combinations thereof using one or more conventional reactors, e.g. fluidized bed gas phase reactors, loop reactors, stirred tank reactors, batch reactors in parallel, series, and/or any combinations thereof.

In one embodiment, the ethylene/α-olefin interpolymer composition is prepared via a process comprising the steps of: (a) polymerizing ethylene and optionally one or more α-olefins in the presence of a first catalyst to form a semi-crystalline ethylene-based polymer in a first reactor or a first part of a multi-part reactor; and (b) reacting freshly supplied ethylene and optionally one or more α-olefins in the presence of a second catalyst comprising an organometallic catalyst thereby forming an ethylene/α-olefin interpolymer composition in at least one other reactor or a later part of a multi-part reactor, wherein at least one of the catalyst systems in step (a) or (b) comprises a metal complex of a polyvalent aryloxyether corresponding to the formula:

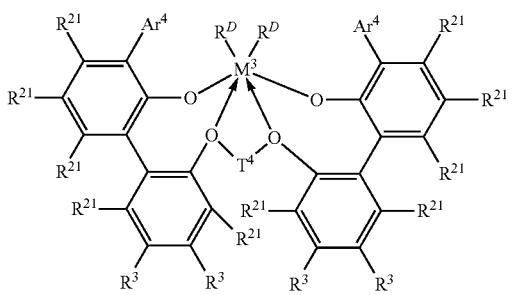

wherein $M^3$ is Ti, Hf or Zr, preferably Zr;

$Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ is independently in each occurrence a $C_{2-20}$ alkylene, cycloalkylene or cycloalkenylene group, or an inertly substituted derivative thereof;

$R^{21}$ is independently in each occurrence hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

The ethylene/α-olefin interpolymer composition may be produced via a solution polymerization according to the following exemplary process.

All raw materials (ethylene, 1-octene) and the process solvent (a narrow boiling range high-purity isoparaffinic solvent commercially available under the tradename Isopar E from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to a pressure that is above the reaction pressure, approximate to 750 psig. The solvent and comonomer (1-octene) feed is pressurized via mechanical positive displacement pump to a pressure that is above the reaction pressure, approximately 750 psig. The individual catalyst components are manually batch diluted to specified component concentrations with purified solvent (Isopar E) and pressurized to a pressure that is above the reaction pressure, approximately 750 psig. All reaction feed flows are measured with mass flow meters, independently controlled with computer automated valve control systems.

The continuous solution polymerization reactor system may consist of two liquid full, non-adiabatic, isothermal, circulating, and independently controlled loops operating in a series configuration. Each reactor has independent control of all fresh solvent, monomer, comonomer, hydrogen, and catalyst component feeds. The combined solvent, monomer, comonomer and hydrogen feed to each reactor is independently temperature controlled to anywhere between 5° C. to 50° C. and typically 40° C. by passing the feed stream through a heat exchanger. The fresh comonomer feed to the polymerization reactors can be manually aligned to add comonomer to one of three choices: the first reactor, the second reactor, or the common solvent and then split between both reactors proportionate to the solvent feed split. The total fresh feed to each polymerization reactor is injected into the reactor at two locations per reactor roughly with equal reactor volumes between each injection location. The fresh feed is controlled typically with each injector receiving half of the total fresh feed mass flow. The catalyst components are injected into the polymerization reactor through specially designed injection stingers and are each separately injected into the same relative location in the reactor with no contact time prior to the reactor. The primary catalyst component feed is computer controlled to maintain the reactor monomer concentration at a specified target. The two cocatalyst components are fed based on calculated specified molar ratios to the primary catalyst component. Immediately following each fresh injection location (either feed or catalyst), the feed streams are mixed with the circulating polymerization reactor contents with static mixing elements. The contents of each reactor are continuously circulated through heat exchangers responsible for removing much of the heat of reaction and with the temperature of the coolant side responsible for maintaining isothermal reaction environment at the specified temperature. Circulation around each reactor loop is provided by a screw pump. The effluent from the first polymerization reactor (containing solvent, monomer, comonomer, hydrogen, catalyst components, and molten polymer) exits the first reactor loop and passes through a control valve (responsible for maintaining the pressure of the first reactor at a specified target) and is injected into the second polymerization reactor of similar design. As the stream exits the reactor, it is contacted with a deactivating agent, e.g. water, to stop the reaction. In addition, various additives such as antioxidants, can be added at this point. The stream then goes through another set of static mixing elements to evenly disperse the catalyst deactivating agent and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatilization system where the polymer is removed from the solvent, hydrogen, and unreacted monomer and comonomer. The recycled stream is purified before entering the reactor again. The separated and devolatized polymer melt is pumped through a die specially designed for underwater pelletization, cut into uniform solid pellets, dried, and transferred into a hopper.

Propylene/α-Olefin Interpolymer Composition

The film composition comprises from 25 to 95 percent by weight of a propylene/α-olefin interpolymer composition, based on the total weight of the film composition. All individual values and subranges from 25 to 95 percent by weight are included herein and disclosed herein; for example, the amount of the propylene/α-olefin interpolymer composition in the film composition can range from a lower limit of 25, 35, 45, 55, 65, 75, 85, or 90 percent by weight to an upper limit of 30, 40, 50, 60, 70, 80, 90 or 95 percent by weight. For example, the amount of propylene/α-olefin interpolymer composition in the film composition may be from 25 to 95 percent by weight, or in the alternative, the amount of propylene/α-olefin interpolymer composition in the film composition may be from 25 to 75 percent by weight, or in the alternative, the amount of propylene/α-olefin interpolymer composition in the film composition may be from 25 to 50 percent by weight, or in the alternative, the amount of propylene/α-olefin interpolymer composition in the film composition may be from 30 to 60 percent by weight, or in the alternative, the amount of propylene/α-olefin interpolymer composition in the film composition may be from 20 to 70 percent by weight, or in the alternative, the amount of propylene/α-olefin interpolymer composition in the film composition may be from 25 to 80 percent by weight.

The propylene/α-olefin interpolymer composition comprises a propylene/alpha-olefin copolymer and/or a propylene/ethylene/butene terpolymer, and may optionally further comprise one or more polymers, e.g. a random copolymer polypropylene (RCP). In one particular embodiment, the propylene/alpha-olefin copolymer is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra.

The propylene/alpha-olefin copolymer comprises from 1 to 40 percent by weight of one or more alpha-olefin comonomers. All individual values and subranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/alpha-olefin copolymer comprises from 1 to 35 percent by weight of one or more alpha-olefin comonomers; or in the alternative, the propylene/alpha-olefin copolymer comprises from 1 to 30 percent by weight of one or more alpha-olefin comonomers; or in the alternative, the propylene/alpha-olefin copolymer comprises from 3 to 27 percent by weight of one or more alpha-olefin comonomers; or in the alternative, the propylene/alpha-olefin copolymer comprises from 3 to 20 percent by weight of one or more alpha-olefin comonomers; or in the alternative, the propylene/alpha-olefin copolymer comprises from 3 to 15 percent by weight of one or more alpha-olefin comonomers.

The propylene/α-olefin interpolymer has a crystallinity in the range of from 1 percent by weight to 30 percent by weight. All individual values and subranges from 1 to 30 percent by weight are included herein and disclosed herein; for example, the crystallinity can range from a lower limit of 1, 5, 15, 20, or 25 percent by weight to an upper limit of 2, 6, 16, 26, or 30 percent by weight. For example, the crystallinity of the propylene/α-olefin interpolymer may be from 1 to 30 percent by weight, or in the alternative, the crystallinity of the propylene/α-olefin interpolymer may be from 1 to 15 percent by weight, or in the alternative, the crystallinity of the propylene/α-olefin interpolymer may be from 15 to 30 percent by weight, or in the alternative, the crystallinity of the propylene/α-olefin interpolymer may be from 10 to 20 percent by weight, or in the alternative, the crystallinity of the propylene/α-olefin interpolymer may be from 5 to 25 percent by weight.

The propylene/α-olefin interpolymer has a heat of fusion in the range of from 2 Joules/gram to 50 Joules/gram. All individual values and subranges from 2 to 50 Joules/gram are included herein and disclosed herein; for example, the heat of fusion can range from a lower limit of 2, 10, 20, 30 40 or 45 Joules/gram to an upper limit of 5, 15, 25, 35, 45, or 50 Joules/gram. For example, the heat of fusion of the propylene/α-olefin interpolymer may be from 2 to 50 Joules/gram, or in the alternative, the heat of fusion of the propylene/α-olefin interpolymer may be from 2 to 25 Joules/gram, or in the alternative, the heat of fusion of the propylene/α-olefin interpolymer may be from 2 to 30 Joules/gram, or in the alternative, the heat of fusion of the propylene/α-olefin interpolymer may be from 12 to 25 Joules/gram, or in the alternative, the heat of fusion of the propylene/α-olefin interpolymer may be from 15 to 30 Joules/gram.

The propylene/α-olefin interpolymer has a DSC melting point in the range of 25 to 110° C. All individual values and subranges from 25 to 110° C. are included herein and disclosed herein; for example, the DSC melting point can range from a lower limit of 25, 35, 45, 55, 65, 75, 85, 95 or 105° C. to an upper limit of 30, 40, 50, 60, 70, 80, 90, 100, or 110° C. For example, the DSC melting point may be from 25 to 110° C., or in the alternative, the DSC melting point may be from 50 to 110° C., or in the alternative, the DSC melting point may be from 25 to 60° C., or in the alternative, the DSC melting point may be from 45 to 90° C., or in the alternative, the DSC melting point may be from 35 to 105° C., or in the alternative, the DSC melting point may be from 45 to 75° C.

In an alternative embodiment, the propylene/alpha-olefin copolymer may have a melt flow rate in the range of from 0.1 to 500 g/10 minutes, measured in accordance with ASTM D-1238 (at 230° C./2.16 Kg). All individual values and subranges from 0.1 to 500 g/10 minutes are included herein and disclosed herein; for example, the melt flow rate can be from a lower limit of 0.1 g/10 minutes, 0.2 g/10 minutes, or 0.5 g/10 minutes to an upper limit of 500 g/10 minutes, 200 g/10 minutes, 100 g/10 minutes, or 25 g/10 minutes. For example, the propylene/alpha-olefin copolymer may have a melt flow rate in the range of from 0.1 to 200 g/10 minutes; or in the alternative, the propylene/alpha-olefin copolymer may have a melt flow rate in the range of from 0.2 to 100 g/10 minutes; or in the alternative, the propylene/alpha-olefin copolymer may have a melt flow rate in the range of from 0.2 to 50 g/10 minutes; or in the alternative, the propylene/alpha-olefin copolymer may have a melt flow rate in the range of from 0.5 to 50 g/10 minutes; or in the alternative, the propylene/alpha-olefin copolymer may have a melt flow rate in the range of from 1 to 50 g/10 minutes; or in the alternative, the propylene/alpha-olefin copolymer may have a melt flow rate in the range of from 1 to 40 g/10 minutes; or in the alternative, the propylene/alpha-olefin copolymer may have a melt flow rate in the range of from 1 to 15 g/10 minutes.

The propylene/alpha-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Propylene/alpha-olefin interpolymers useful in embodiments of the film composition are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In one embodiment, the propylene/alpha-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons. The maximum number of long chain branches in the propylene/alpha-olefin copolymer is not critical, but typically it does not exceed 3 long chain branches/1000 total carbons. The term long chain branch, as used herein with regard to propylene/alpha-olefin copolymers, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. Such propylene/alpha-olefin copolymers are further described in details in the U.S. Provisional Patent Application No. 60/988,999 and International Patent Application No. PCT/US08/082599, each of which is incorporated herein by reference.

The propylene/alpha-olefin interpolymer composition may further comprise one or more additives. Such additives include, but are not limited to, antistatic agents, color enhancers, dyes, lubricants, fillers, pigments, primary antioxidants, secondary antioxidants, processing aids, UV stabilizers, and combinations thereof. The propylene/alpha-olefin interpolymer composition may contain any amounts of additives. The propylene/alpha-olefin composition may compromise from about 0 to about 20 percent by the combined weight of such additives, based on the weight of the propylene/alpha-olefin interpolymer composition and the one or more additives.

Films Made from the Film Composition

In an alternative embodiment, the instant invention further provides a film made from the film composition in accordance with any of the embodiments described herein.

In another alternative embodiment, the instant invention further provides a multi-layer film comprising at least one layer which comprises the film composition in accordance with any of the embodiments described herein.

In a particular embodiment, the multi-layer film comprises two skin layers and a core layer positioned between the two skin layers wherein the core layer comprises the film composition in accordance with any of the embodiments described herein.

In an alternative embodiment, the multi-layer film comprises two skin layers and two or more core layers wherein the core layers are positioned between the two skin layers and further wherein at least one of the core layers comprises the film composition in accordance with any of the embodiments described herein.

In yet another embodiment, the multi-layer film according to any of the embodiments described herein, exhibits a holding force (100/75) equal to or greater than a holding force (100/75) exhibited by a first comparative film having the same thickness as the multi-layer film and comprising two skin layers having the same composition as the skin layers of the multi-layer film and a core layer consisting essentially of the ethylene/α-olefin interpolymer composition used in the film composition of the multi-layer film, and wherein the core to skin thickness ratios of the first comparative film are the same as those of the multi-layer film.

In yet another embodiment, the multi-layer film according to any of the embodiments described herein, exhibits an elastic recovery (60/40) equal to or greater than an elastic recovery (60/40) exhibited by a second comparative film having the same thickness as the multi-layer film and comprising two skin layers having the same composition as the skin layers of the multi-layer film and a core layer consisting essentially of the propylene/α-olefin interpolymer composition used in the film composition of the multi-layer film, and wherein the core to skin thickness ratios of the second comparative film are the same as those of the multi-layer film.

In yet another embodiment, the multi-layer film according to any of the embodiments described herein, exhibits an elastic recovery (100/75) equal to or greater than an elastic recovery (100/75) exhibited by a second comparative film having the same thickness as the multi-layer film and comprising two skin layers having the same composition as the skin layers of the multi-layer film and a core layer consisting essentially of the propylene/α-olefin interpolymer composition used in the film composition of the multi-layer film, and wherein the core to skin thickness ratios of the second comparative film are the same as those of the multi-layer film.

In yet another embodiment, the multi-layer film according to any of the embodiments described herein, wherein the two skin layers comprise an ethylene-based polymer.

In yet another embodiment, the multi-layer film according to any of the embodiments described herein, wherein the two skin layers comprise an ethylene/α-olefin interpolymer composition having a Comonomer Distribution Constant (CDC) in the range of from 75 to 200; a zero shear viscosity ratio (ZSVR) of at least 2; a density in the range of from 0.865 to 0.930 g/cm$^3$, a melt index ($I_2$) in a range of from 0.1 to 5 g/10 minutes, less than 120 total unsaturation units/1,000,000 carbons, and long chain branching frequency in the range of 0.01 to 3 long chain branches (LCB) per 1000 carbons The multi-layer films according to any one of the embodiments described herein may be used to produce an article. Such articles include, for example, bags, sealant layers, packaging, stretch sleeves, shrink sleeves, food and non-food containers, laminates, sacks, caps and closures and liners therefor, agricultural films, storage containers, stretch hoods and articles prepared from blow molding, injection molding, roto-molding, casting, calendaring, laminating, and extrusion coating.

In an alternative embodiment, the invention provides a film composition consisting essentially of: (a) from 5 to 75 percent by weight of an ethylene/α-olefin interpolymer composition (LLDPE), based on the total weight of the film composition, having a Comonomer Distribution Constant (CDC) in the range of from 75 to 200; a zero shear viscosity ratio (ZSVR) of at least 2; a density in the range of from 0.865 to 0.930 g/cm³, a melt index ($I_2$) in a range of from 0.1 to 5 g/10 minutes, less than 120 total unsaturation units/1,000,000 carbons, and long chain branching frequency in the range of 0.01 to 3 long chain branches (LCB) per 1000 carbons; and (b) from 25 to 95 percent by weight of a propylene/α-olefin interpolymer composition, based on the total weight of the film composition, wherein said propylene/α-olefin interpolymer composition comprises a propylene/α-olefin copolymer or a propylene/ethylene/butene terpolymer, wherein said propylene/α-olefin interpolymer has a crystallinity in the range of from 1 percent by weight to 30 percent by weight, a heat of fusion in the range of from 2 Joules/gram to 50 Joules/gram, and a DSC melting point in the range of 25° C. to 110° C.

In another alternative embodiment, the invention provides a film consisting essentially of a film composition which comprises: (a) from 5 to 75 percent by weight of an ethylene/α-olefin interpolymer composition (LLDPE), based on the total weight of the film composition, having a Comonomer Distribution Constant (CDC) in the range of from 75 to 200; a zero shear viscosity ratio (ZSVR) of at least 2; a density in the range of from 0.865 to 0.930 g/cm³, a melt index ($I_2$) in a range of from 0.1 to 5 g/10 minutes, less than 120 total unsaturation units/1,000,000 carbons, and long chain branching frequency in the range of 0.01 to 3 long chain branches (LCB) per 1000 carbons; and (b) from 25 to 95 percent by weight of a propylene/α-olefin interpolymer composition, based on the total weight of the film composition, wherein said propylene/α-olefin interpolymer composition comprises a propylene/α-olefin copolymer or a propylene/ethylene/butene terpolymer, wherein said propylene/α-olefin interpolymer has a crystallinity in the range of from 1 percent by weight to 30 percent by weight, a heat of fusion in the range of from 2 Joules/gram to 50 Joules/gram, and a DSC melting point in the range of 25° C. to 110° C.

In another alternative embodiment, the invention provides a film comprising a film composition which consists essentially of: (a) from 5 to 75 percent by weight of an ethylene/α-olefin interpolymer composition (LLDPE), based on the total weight of the film composition, having a Comonomer Distribution Constant (CDC) in the range of from 75 to 200; a zero shear viscosity ratio (ZSVR) of at least 2; a density in the range of from 0.865 to 0.930 g/cm³, a melt index ($I_2$) in a range of from 0.1 to 5 g/10 minutes, less than 120 total unsaturation units/1,000,000 carbons, and long chain branching frequency in the range of 0.01 to 3 long chain branches (LCB) per 1000 carbons; and (b) from 25 to 95 percent by weight of a propylene/α-olefin interpolymer composition, based on the total weight of the film composition, wherein said propylene/α-olefin interpolymer composition comprises a propylene/α-olefin copolymer or a propylene/ethylene/butene terpolymer, wherein said propylene/α-olefin interpolymer has a crystallinity in the range of from 1 percent by weight to 30 percent by weight, a heat of fusion in the range of from 2 Joules/gram to 50 Joules/gram, and a DSC melting point in the range of 25° C. to 110° C.

In another alternative embodiment, the invention provides a film consisting essentially of a film composition which consists essentially of: (a) from 5 to 75 percent by weight of an ethylene/α-olefin interpolymer composition (LLDPE), based on the total weight of the film composition, having a Comonomer Distribution Constant (CDC) in the range of from 75 to 200; a zero shear viscosity ratio (ZSVR) of at least 2; a density in the range of from 0.865 to 0.930 g/cm³, a melt index ($I_2$) in a range of from 0.1 to 5 g/10 minutes, less than 120 total unsaturation units/1,000,000 carbons, and long chain branching frequency in the range of 0.01 to 3 long chain branches (LCB) per 1000 carbons; and (b) from 25 to 95 percent by weight of a propylene/α-olefin interpolymer composition, based on the total weight of the film composition, wherein said propylene/α-olefin interpolymer composition comprises a propylene/α-olefin copolymer or a propylene/ethylene/butene terpolymer, wherein said propylene/α-olefin interpolymer has a crystallinity in the range of from 1 percent by weight to 30 percent by weight, a heat of fusion in the range of from 2 Joules/gram to 50 Joules/gram, and a DSC melting point in the range of 25° C. to 110° C.

In yet another alternative embodiment, the invention provides a multi-layer film comprising at least one layer which consists essentially of the film composition according to any of the foregoing embodiments.

In yet another embodiment, the invention provides a stretch sleeve comprising a multi-layer film which comprises at least one layer comprising the film composition according to any embodiment disclosed herein.

In yet another embodiment, the invention provides a stretch sleeve comprising a multi-layer film which comprises at least one layer which consists essentially of the film composition according to any embodiment disclosed herein.

Examples

The following examples illustrate the present invention but are not intended to limit the scope of the invention. The examples of the instant invention demonstrate that films produced from the film composition in accordance with the present invention exhibit a synergistic effect on elastic recovery and/or holding force.

Five three-layer films (Inventive Examples 1-2 and Comparative Examples 1-3), each film comprising two skin layers, each skin layer having the same composition and one core layer positioned between the two skin layers, were co-extruded. Each film had a thickness of 89 microns. The three-layer films were made using the polymeric components for the skin and core layers as shown in Table 1. VERSIFY 2300 is a propylene-based polymer which is commercially available from The Dow Chemical Company. ELITE AT 6101 and ELITE AT 6301 are ethylene-based polymers which are commercially available from The Dow Chemical Company. ATTANE NG 4701 G is an ethylene-based polymer which is commercially available from The Dow Chemical Company.

Tables 2 and 3 provide certain physical properties of the Inventive and Comparative Examples. As can be seen, Inventive Examples 1 and 2, in which the core layer comprises an inventive film composition, exhibit elastic recovery (60/40 and 100/75) equal to or greater than elastic recovery of a Comparative Example 1, in which the core layer consists of a propylene/α-olefin interpolymer. Likewise Inventive Example 2 exhibits a holding force (100/75) equal to that of Comparative Example 3, in which the core consists of an ethylene/α-olefin interpolymer.

Additional three layer films (Inventive Examples 3-4 and Comparative Examples 4-5), each comprising two skin layers, each skin layer having the same composition, and one core layer positioned between the two skin layers, were co-extruded. Inventive Examples 3-4 and Comparative Examples 4-5 were made using the polymeric components for the skin and core layers as shown in Table 4. AFFINITY PL 1880G is an ethylene alpha-olefin copolymer having a density measured according to ASTM D 792 of 0.902 g/cm³, and a melt index, $I_2$, measured according to ASTM D 1238 (2.16 kg @190° C.) of 1 g/10 min. AFFINITY PL 1880G is commercially available from The Dow Chemical Company (Midland, Mich.). LDPE 1321 is a low density polyethylene which is commercially available from The Dow Chemical Company, having a density measured according to ASTM D 792 of 0.921 g/cm³, and a melt index, $I_2$, measured according to ASTM D 1238 (2.16 kg @190° C.) of 0.25 g/10 min. LDPE 20020 is a low density polyethylene which is commercially available from PEMEX (México, D.F.), having a density measured according to ASTM D 792 of 0.9205 g/cm³, and a melt index, $I_2$, measured according to ASTM D 1238 (2.16 kg @190° C.) of 2.0 g/10 min. XUS 59900.91 is an enhanced polyethylene resin (LLDPE) which is commercially available from The Dow Chemical Company, having a density measured according to ASTM D792 of 0.913 g/cm³, and a melt index, $I_2$, measured according to ASTM D1238 (2.16 kg @ 190° C.) of 0.80 g/10 min.

Table 5 provides certain physical properties for Comparative Examples 4-5. Table 6 provides certain physical properties for Inventive Examples 3-4.

Table 7 provides certain physical properties of the Inventive Examples 3-4 and Comparative Examples 4-6. As can be seen, Inventive Examples 3 and 4, in which the core layer comprises an inventive film composition, exhibit Stress and Strain properties equal to or greater than Stress and Strain properties of a Comparative Example 4, in which the core layer consists of a propylene/α-olefin interpolymer and Example 6, in which the core consists of an ethylene/α-olefin interpolymer.

Test Methods

Test methods include the following:

Elastic Recovery (60/40 and 100/75) shown in Table 2 were measured according to ASTM D4649.

Elastic Recovery (at 55% and 60% strain) shown in Tables 5 and 6 were measured according to ASTM D5459 on specimens having a 25.4 mm width.

Holding Force (60/40 and 100/75) shown in Table 2 were measured according to ASTM 4649.

Normalized tear CD and MD were measured according to ASTM D1922.

Secant Modulus was measured according to ASTM D882.

Dart B was measured according to ASTM D1709.

The present invention may be embodied in other forms without departing from the spirit and the essential attributes thereof, and, accordingly, reference should be made to the appended claims, rather than to the foregoing specification, as indicating the scope of the invention.

Tables

TABLE 1

| Example | Layer thickness ratio, skin/core/skin | Core resin or resin blend | Skin resin |
|---|---|---|---|
| Comp. Ex. 1 | 20/60/20 | VERSIFY 2300 | ATTANE NG 4701G |
| Inv. Ex. 1 | 20/60/20 | VERSIFY2300/ELITE AT 6101; 60 wt %/40 wt % | ELITE AT 6301 |
| Inv. Ex. 2 | 20/60/20 | VERSIFY2300/ELITE AT 6101; 30 wt %/70 wt % | ELITE AT 6301 |
| Comp. Ex. 2 | 20/60/20 | ELITE AT 6101 | ATTANE NG 4701G |
| Comp. Ex. 3 | 20/60/20 | ELITE AT 6101 | ELITE AT 6301 |

TABLE 2

| Example | Elastic Recovery 60/40, % | Holding force 60/40, lb-ft. | Elastic Recovery 100/75, % | Holding force 100/75, lb-ft. |
|---|---|---|---|---|
| Comp. Ex. 1 | 52 | 1.4 | 47 | 1.5 |
| Inv. Ex. 1 | 55 | 1.9 | 52 | 2.2 |
| Inv. Ex. 2 | 52 | 2 | 49 | 2.3 |
| Comp. Ex. 2 | 48 | 1.9 | 44 | 2.1 |
| Comp. Ex. 3 | 49 | 2.1 | 43 | 2.3 |

TABLE 3

| Example | Normalized tear CD | Normalized tear MD | Secant Modulus, PSI | Dart B |
|---|---|---|---|---|
| Comp. Ex. 1 | 489 | 424 | 14000 | 1420 |
| Inv. Ex. 1 | 461 | 368 | 17200 | 1500 |
| Inv. Ex. 2 | 486 | 404 | 18000 | >1500 |
| Comp. Ex. 2 | 424 | 380 | 16000 | >1500 |
| Comp. Ex. 3 | 420 | 350 | 18000 | >1501 |

TABLE 4

| Example | Layer thickness ratio, skin/core/skin | Core resin or resin blend | Skin resin |
|---|---|---|---|
| Inv. Ex. 3 | 20/60/20 | ELITE AT 6101 (75 wt %) + VERSIFY 2300 (25 wt %) | 80 wt % AFFINITY PL 1880G ++ 20 wt % LDPE 20020 |
| Inv. Ex. 4 | 20/60/20 | 75% wt % ELITE AT 6101 + 25 wt % VERSIFY 2300 | 80 wt % AFFINITY PL1880G + 20 wt % LLDPE XUS59900.91 |
| Comp. Ex. 4 | 20/60/20 | 100 wt % VERSIFY 2300 | 80 wt % AFFINITY PL 1880G + 20 wt % LDPE 132I |
| Comp. Ex. 5 | 20/60/20 | 80% VERSIFY 2300 + 20 wt % LDPE 132I | 80 wt % AFFINITY PL 1880G + 20 wt % LDPE 20020 |
| Comp. Ex. 6 | 20/60/20 | 100% ELITE AT 6101 | 100% LDPE 770G |

TABLE 5

| Property | | Comparative Example 4 | Comparative Example 5 |
|---|---|---|---|
| Avg-Elastic Recovery | % | 91.627 | 93.4016 |
| Avg-Elongation at Stress Recommence | In | 0.093 | 0.0732 |
| Avg-Load At Initial Strain | Lbf | 1.876 | 1.714 |
| Avg-Load At Secondary Strain | Lbf | 1.486 | 1.295 |
| Avg-Maximum Elongation | In | 1.105 | 1.105 |
| Avg-Nominal Gage Length | In | 2 | 2 |
| Avg-Permanent Deformation | % | 8.373 | 6.5984 |
| Avg-Strain Point | % | 55 | 55 |
| Avg-Stress Retention | % | 79.236 | 75.556 |
| Avg-Thickness | Mil | 1.967 | 1.99 |
| Avg-Elastic Recovery | % | 91.928 | 93.232 |
| Avg-Elongation at Stress Recommence | In | 0.098 | 0.082 |
| Avg-Load At Initial Strain | Lbf | 1.885 | 1.788 |
| Avg-Load At Secondary Strain | lbf | 1.49 | 1.348 |
| Avg-Maximum Elongation | in | 1.205 | 1.205 |
| Avg-Nominal Gage Length | in | 2 | 2 |
| Avg-Permanent Deformation | % | 8.072 | 6.768 |
| Avg-Strain Point | % | 60 | 60 |
| Avg-Stress Retention | % | 79.022 | 75.373 |
| Avg-Thickness | mil | 1.942 | 2.017 |

TABLE 6

| Property | | Inventive Example 3 | Inventive Example 4 |
|---|---|---|---|
| Avg-Elastic Recovery | % | 89.87 | 90.11 |
| Avg-Elongation at Stress Recommence | In | 0.28 | 0.11 |
| Avg-Load At Initial Strain | Lbf | 1.75 | 2.19 |
| Avg-Load At Secondary Strain | Lbf | 1.51 | 1.73 |
| Avg-Maximum Elongation | In | 2.75 | 1.11 |
| Avg-Nominal Gage Length | In | 5 | 2 |
| Avg-Permanent Deformation | % | 10.13 | 9.9 |
| Avg-Strain Point | % | 55 | 55 |
| Avg-Stress Retention | % | 86 | 79 |
| Avg-Thickness | mil | 2.00 | 1.95 |
| Avg-Elastic Recovery | % | 90.20 | 91.24 |
| Avg-Elongation at Stress Recommence | in | 0.30 | 0.11 |
| Avg-Load At Initial Strain | lbf | 1.78 | 2.14 |
| Avg-Load At Secondary Strain | lbf | 1.51 | 1.72 |
| Avg-Maximum Elongation | in | 3.01 | 1.21 |
| Avg-Nominal Gage Length | in | 5 | 2 |
| Avg-Permanent Deformation | % | 9.80 | 8.8 |
| Avg-Strain Point | % | 60 | 60 |
| Avg-Stress Retention | % | 85 | 80 |
| Avg-Thickness | mil | 1.97 | 1.98 |

TABLE 7

| Property | | Comparative Example 4 | Inventive Example 3 | Inventive Example 4 | Comparative Example 6 |
|---|---|---|---|---|---|
| Avg-Break Stress | psi | 1381 | 5010 | 4825 | 5220 |
| Avg-Strain at Break | % | 316 | 607 | 661 | 591 |
| Avg-Stress at Yield | psi | 1049 | 1069 | 1169 | 1112 |
| Avg-Strain at Yield | % | 79.02 | 82.56 | 77.70 | 70.6 |
| Avg-Thickness | mil | 1.978 | 1.96 | 2.03 | 2.07 |

We claim:

1. A film composition comprising:
   (a) from 5 to 75 percent by weight of an ethylene/α-olefin interpolymer composition (LLDPE), based on the total weight of the film composition, having a Comonomer Distribution Constant (CDC) in the range of from 75 to 200; a zero shear viscosity ratio (ZSVR) of at least 2; a density in the range of from 0.865 to 0.930 g/cm$^3$, a melt index (I$_2$) in a range of from 0.1 to 5 g/10 minutes, less than 120 total unsaturation units/1,000,000 carbons, and long chain branching frequency in the range of 0.01 to 3 long chain branches (LCB) per 1000 carbons;
   (b) from 25 to 95 percent by weight of a propylene/α-olefin interpolymer composition, based on the total weight of the film composition, wherein said propylene/α-olefin interpolymer composition comprises a propylene/α-olefin copolymer or a propylene/ethylene/butene terpolymer, wherein said propylene/α-olefin interpolymer has a crystallinity in the range of from 1 percent by weight to 30 percent by weight, a heat of fusion in the range of from 2 Joules/gram to 50 Joules/gram, and a DSC melting point in the range of 25° C. to 110° C., wherein a film formed from the film composition exhibits a holding force (100/75) as measured in accordance with ASTM 4649 that is greater than or equal to a holding force of a comparative film having the same thickness as the film but formed from materials without (a) and (b), and exhibits an elastic recovery (60/40) as measured in accordance with ASTM D4649 that is greater than or equal to an elastic recovery of the comparative film.

2. A film comprising the film composition of claim 1, wherein the film exhibits a holding force (100/75) as measured in accordance with ASTM 4649 that is greater than or equal to a holding force of a comparative film having the same thickness as the film but formed from materials without (a) and (b) and exhibits an elastic recovery (60/40) as measured in accordance with ASTM D4649 that is greater than or equal to an elastic recovery of the comparative film.

3. A multi-layer film comprising at least one layer which comprises the film composition of claim 1 wherein the multi-layer film exhibits a holding force (100/75) as measured in accordance with ASTM 4649 that is greater than or equal to a holding force of a comparative multi-layer film having the same thickness as the multi-layer film but formed from materials without (a) and (b) and exhibits an elastic recovery (60/40) as measured in accordance with ASTM D4649 that is greater than or equal to an elastic recovery of the comparative multi-layer film.

4. The multi-layer film according to claim 3, wherein the multi-layer film comprises two skin layers and one core layer derived from a film composition which comprises (a)

from 5 to 75 percent by weight of an ethylene/α-olefin interpolymer composition (LLDPE), based on the total weight of the film composition, having a Comonomer Distribution Constant (CDC) in the range of from 75 to 200; a zero shear viscosity ratio (ZSVR) of at least 2; a density in the range of from 0.865 to 0.930 g/cm$^3$, a melt index (I$_2$) in a range of from 0.1 to 5 g/10 minutes, less than 120 total unsaturation units/1,000,000 carbons, and long chain branching frequency in the range of 0.01 to 3 long chain branches (LCB) per 1000 carbons; (b) from 25 to 95 percent by weight of a propylene/α-olefin interpolymer composition, based on the total weight of the film composition, wherein said propylene/α-olefin interpolymer composition comprises a propylene/α-olefin copolymer or a propylene/ethylene/butene terpolymer, wherein said propylene/α-olefin interpolymer has a crystallinity in the range of from 1 percent by weight to 30 percent by weight, a heat of fusion in the range of from 2 Joules/gram to 50 Joules/gram, and a DSC melting point in the range of 25° C. to 110° C.

5. The multi-layer film according to claim 4, wherein the multi-layer film exhibits a holding force (100/75) as measured in accordance with ASTM 4649 equal to or greater than a holding force (100/75) exhibited by a first comparative film having the same thickness as the multi-layer film and comprising two skin layers having the same composition as the skin layers of the multi-layer film and a core layer consisting essentially of the ethylene/α-olefin interpolymer composition used in the film composition of the multi-layer film, and wherein the core to skin thickness ratios of the first comparative film are the same as those of the multi-layer film.

6. A stretch hood comprising the multi-layer film according to claim 4.

7. A film composition for a core layer of a multilayer film comprising:
(a) from 5 to 75 percent by weight of an ethylene/α-olefin interpolymer composition (LLDPE), based on the total weight of the film composition, having a Comonomer Distribution Constant (CDC) in the range of from 75 to 200; a zero shear viscosity ratio (ZSVR) of at least 2; a density in the range of from 0.865 to 0.930 g/cm$^3$, a melt index (I$_2$) in a range of from 0.1 to 5 g/10 minutes, less than 120 total unsaturation units/1,000,000 carbons, and long chain branching frequency in the range of 0.01 to 3 long chain branches (LCB) per 1000 carbons;
(b) from 25 to 95 percent by weight of a propylene/α-olefin interpolymer composition, based on the total weight of the film composition, wherein said propylene/α-olefin interpolymer composition comprises a propylene/α-olefin copolymer or a propylene/ethylene/butene terpolymer, wherein said propylene/α-olefin interpolymer has a crystallinity in the range of from 1 percent by weight to 30 percent by weight, a heat of fusion in the range of from 2 Joules/gram to 50 Joules/gram, and a DSC melting point in the range of 25° C. to 110° C., wherein a film formed from the film composition exhibits a holding force (100/75) as measured in accordance with ASTM 4649 that is greater than or equal to a holding force of a comparative film formed from materials without (a) and (b), and exhibits an elastic recovery (60/40) as measured in accordance with ASTM D4649 that is greater than or equal to an elastic recovery of the comparative film.

8. A film comprising the film composition of claim 7, wherein the film exhibits a holding force (100/75) as measured in accordance with ASTM 4649 that is greater than or equal to a holding force of a comparative film formed from materials without (a) and (b), and exhibits an elastic recovery (60/40) as measured in accordance with ASTM D4649 that is greater than or equal to an elastic recovery of the comparative film.

9. A multi-layer film comprising two skin layers and one core layer which comprises the film composition of claim 1, wherein the multi-layer film exhibits a holding force (100/75) as measured in accordance with ASTM 4649 that is greater than or equal to a holding force of a comparative multi-layer film having the same thickness as the multi-layer film but formed from materials without (a) and (b), and exhibits an elastic recovery (60/40) as measured in accordance with ASTM D4649 that is greater than or equal to an elastic recovery of the comparative multilayer film.

10. The multi-layer film according to claim 9, wherein the two skin layers comprise an ethylene/α-olefin interpolymer composition having a Comonomer Distribution Constant (CDC) in the range of from 75 to 200; a zero shear viscosity ratio (ZSVR) of at least 2; a density in the range of from 0.865 to 0.930 g/cm$^3$, a melt index (I$_2$) in a range of from 0.1 to 5 g/10 minutes, less than 120 total unsaturation units/1,000,000 carbons, and long chain branching frequency in the range of 0.01 to 3 long chain branches (LCB) per 1000 carbons.

11. A stretch sleeve comprising the multi-layer film according to claim 9.

* * * * *